United States Patent
Uneura

(10) Patent No.: US 10,408,260 B2
(45) Date of Patent: Sep. 10, 2019

(54) BEARING STRUCTURE AND TURBOCHARGER

(71) Applicant: IHI Corporation, Koto-ku (JP)

(72) Inventor: Yutaka Uneura, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/860,100

(22) Filed: Jan. 2, 2018

(65) Prior Publication Data
US 2018/0119572 A1 May 3, 2018

Related U.S. Application Data

(63) Continuation of application No. PCT/JP2016/069665, filed on Jul. 1, 2016.

(30) Foreign Application Priority Data

Jul. 9, 2015 (JP) ................. 2015-137424

(51) Int. Cl.
*F16C 27/04* (2006.01)
*F01D 25/16* (2006.01)
(Continued)

(52) U.S. Cl.
CPC ............ *F16C 27/045* (2013.01); *F01D 25/16* (2013.01); *F01D 25/18* (2013.01); *F02B 39/00* (2013.01);
(Continued)

(58) Field of Classification Search
CPC .... F16C 19/181; F16C 19/183; F16C 19/184; F16C 19/547; F16C 19/548; F16C 27/045; F16C 33/586
See application file for complete search history.

(56) References Cited

U.S. PATENT DOCUMENTS 8,545,106 B2* 10/2013 Miller ................. F16C 33/6659
384/473
8,764,305 B2* 7/2014 Henneberger .......... F16C 19/28
384/551
(Continued)

FOREIGN PATENT DOCUMENTS

CN 1890475 1/2007
CN 103649545 3/2014
(Continued)

OTHER PUBLICATIONS

International Search Report dated Sep. 13, 2016 in PCT/JP2016/069665 filed Jul. 1, 2016 (with English Translation).
(Continued)

*Primary Examiner* — James Pilkington
(74) *Attorney, Agent, or Firm* — Oblon, McClelland, Maier & Neustadt, L.L.P.

(57) ABSTRACT

A bearing structure includes: a ball bearing disposed in a bearing hole formed in a housing of a turbocharger, the ball bearing having an outer ring formed with a damper portion on an outer circumferential surface thereof; an opposed member fixed to the housing, the opposed member opposed to the outer ring in an axial direction of a shaft; a protruding portion formed on one of the outer ring and the opposed member, the protruding portion protruding toward another one of the outer ring and the opposed member; and a regulating portion formed on the other one of the outer ring and the opposed member, the regulating portion opposed to the protruding portion in a rotation direction of the shaft.

18 Claims, 3 Drawing Sheets

(51) Int. Cl.
- *F16C 19/18* (2006.01)
- *F16C 19/54* (2006.01)
- *F16C 33/58* (2006.01)
- *F02B 39/00* (2006.01)
- *F02B 39/14* (2006.01)
- *F01D 25/18* (2006.01)
- *F16C 33/66* (2006.01)
- *F16C 35/067* (2006.01)
- *F16C 19/16* (2006.01)

(52) U.S. Cl.
CPC ............ *F02B 39/14* (2013.01); *F16C 19/184* (2013.01); *F16C 19/548* (2013.01); *F16C 33/586* (2013.01); *F16C 33/6685* (2013.01); *F05D 2220/40* (2013.01); *F05D 2240/50* (2013.01); *F05D 2260/98* (2013.01); *F16C 19/163* (2013.01); *F16C 33/6681* (2013.01); *F16C 35/067* (2013.01); *F16C 2360/24* (2013.01)

(56) References Cited

U.S. PATENT DOCUMENTS

| | | |
|---|---|---|
| 2007/0183704 A1 | 8/2007 | Umekawa |
| 2014/0090626 A1 | 4/2014 | An et al. |

FOREIGN PATENT DOCUMENTS

| | | |
|---|---|---|
| EP | 0339601 * | 4/1989 |
| EP | 1 705 393 A1 | 9/2006 |
| EP | 2 733 359 A1 | 5/2014 |
| JP | 01-159132 U | 11/1989 |
| JP | 01-162046 U | 11/1989 |
| JP | 2001-041233 | 2/2001 |
| JP | 2004-360778 | 12/2004 |
| JP | 2005-171796 | 6/2005 |
| JP | 2005-172098 | 6/2005 |
| JP | 2008-138779 | 6/2008 |
| JP | 2009-264526 | 11/2009 |
| JP | 2011-236967 | 11/2011 |
| JP | 2013-024059 | 2/2013 |
| JP | 2013-155688 | 8/2013 |
| JP | 2014-125920 | 7/2014 |
| JP | 2014-126091 | 7/2014 |
| WO | WO 2005/057032 A1 | 6/2005 |
| WO | WO 2009/133445 A1 | 11/2009 |
| WO | WO 2013/011839 A1 | 1/2013 |

OTHER PUBLICATIONS

Written Opinion dated Sep. 13, 2016 in PCT/JP2016/069665 filed Jul. 1, 2016.
English translation of International Preliminary Report on Patentability and Written Opinion dated Jan. 18, 2018 in PCT/JP2016/069665, 6 pages.
Office Action dated Aug. 21, 2018 in Japanese Patent Application No. 2017-527425, (with English translation), 7 pages.

* cited by examiner

BEARING STRUCTURE AND TURBOCHARGER

CROSS REFERENCE TO RELATED APPLICATIONS

This application is a continuation application of International Application No. PCT/JP2016/069665, filed on Jul. 1, 2016, which claims priority to Japanese Patent Application No. 2015-137424, filed on Jul. 9, 2015, the entire contents of which are incorporated by reference herein.

BACKGROUND ART

Technical Field

The present disclosure relates to a bearing structure, pivotally supporting a shaft, and a turbocharger.

Related Art

In the related art, turbochargers in which a shaft is pivotally supported by a bearing housing in a freely rotatable manner are known. A turbine impeller is provided at one end of the shaft and a compressor impeller is provided on another end. The turbocharger is connected to an engine, and the turbine impeller is rotated by exhaust gas discharged from the engine. The rotation of the turbine impeller causes the compressor impeller to rotate via the shaft. In this manner, the turbocharger compresses the air in accordance with the rotation of the compressor impeller and delivers the air to the engine.

In the turbocharger described in Patent Literature 1, an annular case part is disposed in a bearing hole formed in the housing. A pair of ball bearings are assembled inside the case part. An outer circumferential surface of the case part functions as a damper portion which suppresses vibration of the shaft by lubricating oil supplied between the outer circumferential surface and the bearing hole.

CITATION LIST

Patent Literature

Patent Literature 1: Japanese Patent Application Laid-Open No. 2009-264526

SUMMARY

Technical Problem

As described above, in the structure in which the ball bearings are assembled to the case part, the shaft can be pivotally supported while vibration of the shaft is suppressed. However, the cost using for processing and assembling of the case part disadvantageously increases.

An object of the present disclosure is to provide a bearing structure and a turbocharger capable of implementing both functions of suppressing vibration of and pivotally supporting a shaft at low cost.

Solution to Problem

In order to solve the above problem, a bearing structure includes: a ball bearing disposed in a bearing hole formed in a housing of a turbocharger, the ball bearing having an outer ring formed with a damper portion on an outer circumferential surface thereof; an opposed member fixed to the housing, the opposed member opposed to the outer ring in an axial direction of a shaft; a protruding portion formed on one of the outer ring and the opposed member, the protruding portion protruding toward another one of the outer ring and the opposed member; and a regulating portion formed on the other one of the outer ring and the opposed member, the regulating portion opposed to the protruding portion in a rotation direction of the shaft.

The damper portion may include a protrusion protruding in a radial direction of the shaft from the outer circumferential surface of the outer ring and extending in the rotation direction.

The ball bearing may be an angular bearing, and the opposed member may be opposed to a thick side end surface which is an end surface thicker in the radial direction of the shaft out of both end surfaces of the outer ring in the axial direction. Moreover, the protruding portion or the regulating portion may be formed on the thick side end surface.

Two ball bearings may be provided in the bearing hole while separated from each other in the axial direction, and the opposed member may be a spacer disposed between the two ball bearings to regulate movement of the two ball bearings in a direction approaching one another.

A fixing groove extending in the rotation direction may be formed in the bearing hole, and the opposed member may have a main body portion of an arc shape. Moreover, an outer circumferential surface of the main body portion may be fitted into the fixing groove, and the regulating portion may be formed at both ends of the main body portion in a circumferential direction thereof.

An oil groove may be formed in either one of or both of the outer ring and the opposed member.

In order to solve the above problem, the turbocharger includes the bearing structure described above.

Effects of Disclosure

According to the present disclosure, it is possible to implement both functions of suppressing vibration of and pivotally supporting a shaft at low cost.

DESCRIPTION OF EMBODIMENT

A reasonable embodiment will be described in detail below with reference to the accompanying drawings. The dimensions, materials, other specific numerical values, and the like illustrated in such embodiment are merely examples for facilitating understanding, and a structure is not limited thereby except for a case where it is specifically mentioned. Note that, in the present specification and the drawings, elements having substantially the same function and structure are denoted by the same symbol, and redundant explanations are omitted.

Figure 1:
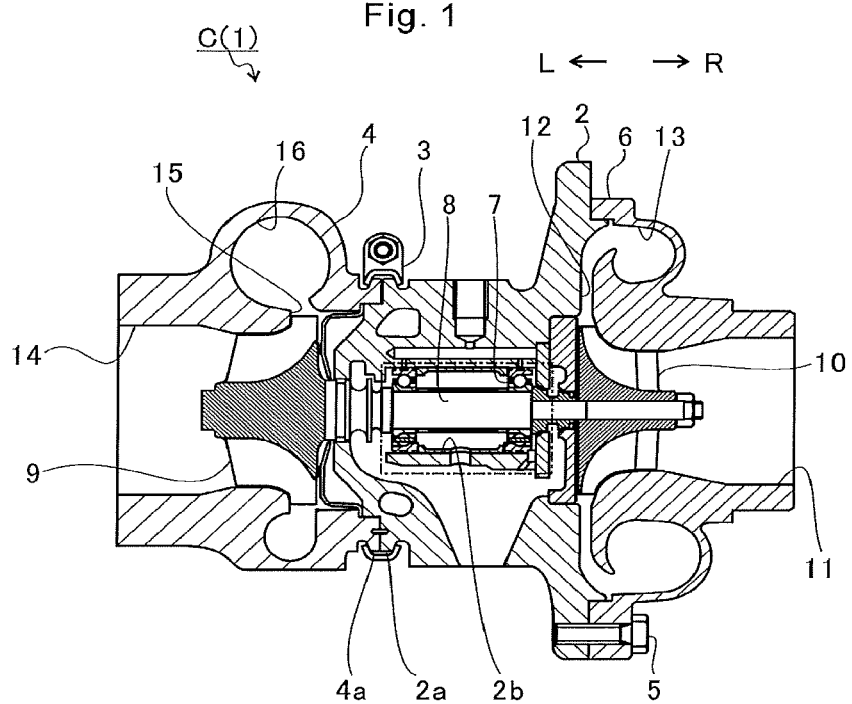
FIG. 1 is a schematic cross-sectional view of a turbocharger.

FIG. 1 is a schematic cross-sectional view of a turbocharger C. Hereinafter, descriptions are given assuming that a direction of an arrow L illustrated in FIG. 1 is a left side of the turbocharger C and that a direction of an arrow R is a right side of the turbocharger C. As illustrated in FIG. 1, the turbocharger C includes a turbocharger main body 1. The turbocharger main body 1 includes a bearing housing 2 (housing). A turbine housing 4 is connected to the left side of the bearing housing 2 by a fastening mechanism 3. A compressor housing 6 is connected to the right side of the bearing housing 2 by a fastening bolt 5. The bearing housing 2, the turbine housing 4, and the compressor housing 6 are integrated.

A protrusion 2a protruding in a radial direction of the bearing housing 2 is provided on an outer circumferential surface of the bearing housing 2 in the vicinity of the turbine housing 4. Furthermore, a protrusion 4a protruding in a radial direction of the turbine housing 4 is provided on an outer circumferential surface of the turbine housing 4 in the vicinity of the bearing housing 2. The bearing housing 2 and the turbine housing 4 are fixed to each other by fastening the protrusions 2a and 4a by the fastening mechanism 3. The fastening mechanism 3 is formed by, for example, a G coupling which clamps the protrusions 2a and 4a.

In the bearing housing 2, a bearing hole 2b penetrating the turbocharger C in the right-and-left direction is formed. Ball bearings 7 are provided in a bearing hole 2b. The shaft 8 is pivotally supported by the ball bearings 7 in a freely rotatable manner. A turbine impeller 9 is integrally fixed to a left end portion of the shaft 8. The turbine impeller 9 is accommodated in the turbine housing 4 in a freely rotatable manner. A compressor impeller 10 is integrally fixed to a right end portion of the shaft 8. The compressor impeller 10 is accommodated in the compressor housing 6 in a freely rotatable manner.

In the compressor housing 6, an intake port 11 opening toward the right side of the turbocharger C is formed. The intake port 11 is connected to an air cleaner (not illustrated). In a state where the bearing housing 2 and the compressor housing 6 are connected by the fastening bolt 5, opposed surfaces of the bearing housing 2 and the compressor housing 6 form a diffuser flow passage 12 for pressurizing the air. The diffuser flow passage 12 is annularly formed outward from an inner side in the radial direction of the shaft 8. The diffuser flow passage 12 communicates with the intake port 11 via the compressor impeller 10 on the inner side in the radial direction.

In the compressor housing 6, an annular compressor scroll flow passage 13 positioned on an outer side in the radial direction of the shaft 8 than the diffuser flow passage 12 is provided. The compressor scroll flow passage 13 communicates with an intake port of an engine (not illustrated) and the diffuser flow passage 12. When the compressor impeller 10 rotates, the air is sucked into the compressor housing 6 from the intake port 11. The sucked air is accelerated by the action of the centrifugal force in the process of flowing through blades of the compressor impeller 10. The accelerated air is pressurized by the diffuser flow passage 12 and the compressor scroll flow passage 13 and guided to the intake port of the engine.

In the turbine housing 4, a discharge port 14 opening toward the left side of the turbocharger C is formed. The discharge port 14 is connected to an exhaust gas purification device (not illustrated). In addition, a flow passage 15 is provided in the turbine housing 4. In the turbine housing 4, an annular turbine scroll flow passage 16 positioned on the outer side in the radial direction of the turbine impeller 9 than the flow passage 15 is provided. The turbine scroll flow passage 16 communicates with a gas inlet port (not illustrated) through which exhaust gas discharged from an exhaust manifold (not illustrated) of the engine is guided. The turbine scroll flow passage 16 communicates also with the flow passage 15. Therefore, the exhaust gas guided from the gas inlet port to the turbine scroll flow passage 16 is guided to the discharge port 14 via the flow passage 15 and the turbine impeller 9. The exhaust gas rotates the turbine impeller 9 in the process of flowing therethrough.

The turning force of the turbine impeller 9 is then transmitted to the compressor impeller 10 via the shaft 8. When the compressor impeller 10 rotates, the air is pressurized and guided to the intake port of the engine as described above.

Figure 2:
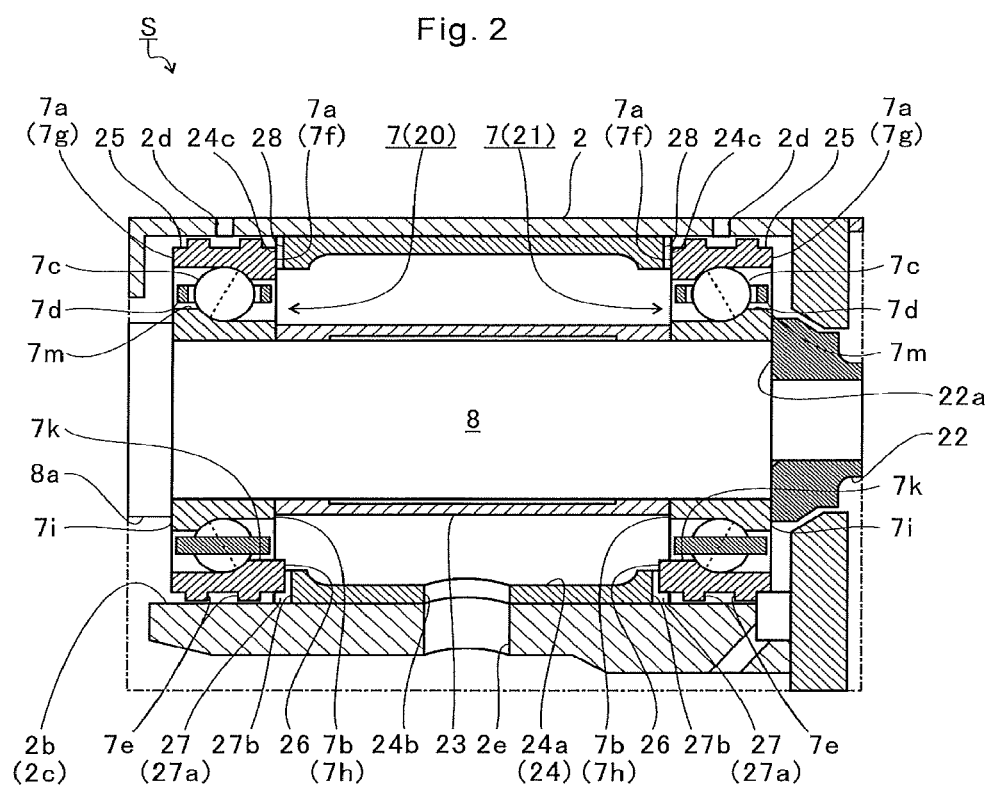
FIG. 2 is a view extracted from a one-dot chain line portion of FIG. 1.

FIG. 2 is a view extracted from a one-dot chain line portion of FIG. 1. As illustrated in FIG. 2, the turbocharger C has a bearing structure S. In the bearing structure S, as described above, the ball bearings 7 are arranged in the bearing hole 2b. The shaft 8 is pivotally supported by the ball bearings 7. Two ball bearings 7 are disposed in the bearing hole 2b while separated from each other in an axial direction of the shaft 8 (hereinafter simply referred to as the axial direction).

Hereinafter, when the two ball bearings 7 are distinguished and referred to, the ball bearing 7 on the left side (the side of the turbine impeller 9) in FIG. 2 is referred to as a turbine side bearing 20. Furthermore, in FIG. 2, the ball bearing 7 on the right side (the side of the compressor impeller 10) is referred to as a compressor side bearing 21.

In the ball bearing 7, a plurality of rolling elements 7c is arranged between an outer ring 7a and an inner ring 7b. The plurality of rolling elements 7c is substantially in point contact with each of the outer ring 7a and the inner ring 7b. A retainer 7d maintains an interval in the circumferential direction of the inner ring 7b of the plurality of rolling elements 7c at a predetermined width.

The ball bearing 7 is, for example, an angular bearing. A connection (indicated by a broken line in FIG. 2) connecting a contact point between the outer ring 7a and one of the rolling elements 7c and a contact point between the rolling element 7c and the inner ring 7b is inclined with respect to a plane direction perpendicular to the axial direction of the shaft 8 (has a contact angle).

The ball bearing 7 can receive a thrust load in addition to a radial load of the shaft 8. A thrust load acting rightward on the shaft 8 in FIG. 2 is received by the turbine side bearing 20. In addition, the thrust load acting leftward on the shaft 8 in FIG. 2 is received by the compressor side bearing 21.

In this manner, in order to provide the contact angle to the ball bearings 7, the thickness of the outer ring 7a is different at both end surfaces in the axial direction (the thickness in the radial direction of the shaft 8). In the outer ring 7a of the two ball bearings 7, an end surface of each of the ball bearings 7 in a direction approaching one another (hereinafter simply referred to as an approaching direction) (hereinafter referred to as a thick side end surface 7f) is thicker than an end surface 7g on the opposite side. Similarly, the thickness of the inner ring 7b is also different at both end surfaces thereof in the axial direction. In the inner ring 7b of the two ball bearings 7, an end surface 7h in the approaching direction is thinner than an end surface 7i on the opposite side.

On the outer circumferential surface of the ball bearing 7 (outer ring 7a), two annular protrusions 7e (protrusions) are formed while separated in the axial direction. The annular protrusion 7e protrudes in the radial direction of the shaft 8 on the outer circumferential surface of the outer ring 7a. Furthermore, the annular protrusion 7e extends annularly over the entire circumference of the outer circumferential surface of the outer ring 7a.

The two annular protrusions 7e are separated from an inner circumferential surface 2c of the bearing hole 2b. On the inner circumferential surface 2c of the bearing hole 2b, an oil hole 2d is opened between portions opposite to the two annular protrusions 7e. The oil hole 2d is positioned above the shaft 8 in the vertical direction (upper side in FIG. 2). The oil hole 2d communicates with the outside of the bearing housing 2. Lubricating oil delivered from an oil pump (not illustrated) is supplied to the bearing hole 2b from the oil hole 2d. The ball bearing 7 is lubricated by the lubricating oil supplied to the bearing hole 2b.

In the shaft 8, a large diameter portion 8a is formed at a portion of the bearing hole 2b positioned on the left side in FIG. 2. An outer diameter of the large diameter portion 8a is larger than an inner diameter and smaller than an outer diameter of the end surface 7i of the inner ring 7b of the turbine side bearing 20. The inner ring 7b of the turbine side bearing 20 is positioned by the large diameter portion 8a.

An oil thrower member 22 is fixed to a portion of the shaft 8 that is positioned on the right side in the bearing hole 2b in FIG. 2. The oil thrower member 22 scatters the lubricating oil after lubricating the compressor side bearing 21 radially outward to suppress leakage of the lubricating oil to the side of the compressor impeller 10.

An outer diameter of the left end surface 22a of the oil thrower member 22 in FIG. 2 is larger than the inner diameter and smaller than the outer diameter of the end surface 7i of the inner ring 7b of the compressor side bearing 21. That is, the inner ring 7b of the compressor side bearing 21 abuts on the oil thrower member 22.

An inner diameter side spacer 23 is an annular member. The inner diameter side spacer 23 is provided between the two ball bearings 7 with the shaft 8 inserted therein. An outer diameter of the inner diameter side spacer 23 is larger than an inner diameter and smaller than an outer diameter of the end surface 7h of the inner ring 7b.

The inner rings 7b of the two ball bearings 7 and the inner diameter side spacer 23 are fixed by compressive stress (axial force) acting in the axial direction. More specifically, the inner ring 7b of the turbine side bearing 20, the inner diameter side spacer 23, the inner ring 7b of the compressor side bearing 21, the oil thrower member 22, and the compressor impeller 10 are arranged in this order from the end portion on the compressor impeller 10 side of the shaft 8. Moreover, the fastening bolt is fastened at the end portion of the shaft 8 on the side of the compressor impeller 10. As a result, the respective members are interposed between the large diameter portion 8a and the fastening bolt. The respective members are fixed to the shaft 8 by axial force and rotate integrally with the shaft 8.

An outer diameter side spacer 24 (opposed member, spacer) is provided with an annular main body portion 24a. The main body portion 24a includes a through hole 24b penetrating from an inner circumferential surface to an outer circumferential surface of the main body portion 24a. The outer diameter side spacer 24 is arranged between the two ball bearings 7 and on an outer side in the radial direction from the inner diameter side spacer 23 with the shaft 8 is inserted therein.

Here, the outer diameter side spacer 24 is press-fitted into the bearing hole 2b and fixed to the bearing housing 2. At this time, the through hole 24b is arranged below the shaft 8 in the vertical direction (lower side in FIG. 2). The bearing housing 2 includes an oil drainage port 2e. The oil drainage port 2e penetrates an inner wall of the bearing hole 2b from a position opposed to the through hole 24b to a lower side thereof in the vertical direction.

Furthermore, an inner diameter of an end surface 24c on both sides of the main body portion 24a in the axial direction is larger than an inner diameter and smaller than an outer diameter of the thick side end surface 7f of the outer ring 7a of the ball bearing 7. That is, the outer diameter side spacer 24 is opposed to the outer ring 7a of the ball bearing 7 in the axial direction. Therefore, movement of the outer ring 7a of each of the two ball bearings 7 in the approaching direction (axial direction) is restricted, and a position of the shaft 8 in the axial direction is restricted. Here, the axial length of the outer diameter side spacer 24 is set to be slightly shorter than the axial distance between the outer rings 7a of the two ball bearings 7. That is, a gap is provided between the thick side end surface 7f of the outer ring 7a of the ball bearing 7 and the end surfaces of the main body portion 24a of the outer diameter side spacer 24. Therefore, the outer ring 7a is not constrained in the axial direction. The outer ring 7a is held to be slightly movable in the axial direction. Thus, when the shaft 8 moves in the axial direction upon driving, the thick side end surface 7f of the outer diameter side spacer 24 and one of the end surfaces of the main body portion 24a come into contact. Thus, movement of the shaft 8 in the axial direction is restricted. Here, of the outer ring 7a, a thick portion 7k protruding toward the rolling elements 7c (inward in the radial direction) is positioned in the approaching direction of the two outer rings 7a with respect to the rolling elements 7c. Furthermore, of the inner ring 7b, a thick portion 7m protruding toward the rolling elements 7c (outward in the radial direction) is positioned in a separating direction of the two outer rings 7a with respect to the rolling elements 7c. The thick portions 7k and 7m are axially opposed to the rolling elements 7c. Note that the turbine side bearing 20 and the compressor side bearing 21 may be disposed while interchanged. In this case, the thick portion 7k of the outer ring 7a is positioned in the separating direction of the two outer rings 7a with respect to the rolling elements 7c. The thick portion 7m of the inner ring 7b is positioned in the approaching direction of the two outer rings 7a with respect to the rolling elements 7c. The thick side end surface 7f of the outer ring 7a of the ball bearing 7 is on the opposite side (separating direction) of the approaching direction of the two outer rings 7a. The thick side end surface 7f is formed on an outer side of the outer ring 7a which is on the opposite side to the approaching direction of the two outer rings 7a. Furthermore, for example, an outer diameter side spacer is provided opposed to each of the thick side end surfaces 7f of the two outer rings 7a from an outer side thereof. That is, two outer diameter side spacers are provided. In this manner, movement of the outer ring 7a of each of the two ball bearings 7 in the separating direction (axial direction) is restricted.

Furthermore, the inner ring 7b is fixed to the shaft 8. When the inner ring 7b rotates together with the shaft 8, the rolling elements 7c receives frictional force from contact points with the inner ring 7b and rotates. At this time, lubricating oil is supplied to the ball bearing 7 from the oil hole 2d. Therefore, the friction coefficient decreases, and transmission of rotational force from the inner ring 7b to the rolling elements 7c is suppressed. In addition, rolling resistance of the rolling elements 7c is suppressed, and mechanical loss is reduced.

A damper portion 25 is further formed on the outer circumferential surface of the ball bearing 7 (outer ring 7a). The damper portion 25 is a part of the outer ring 7a. In other words, the damper portion 25 is formed by a member forming the outer ring 7a. That is, the outer circumferential surface of the outer ring 7a functions as the damper portion 25. The damper portion 25 includes the annular protrusion 7e described above. Vibration of the shaft 8 is suppressed by the lubricating oil supplied between the damper portion 25 and the inner circumferential surface 2c of the bearing hole 2b from the oil hole 2d.

Here, the annular protrusion 7e is provided for the following reason. That is, the damper portion 25 needs to adjust the width in the axial direction and an interval with the inner circumferential surface in the radial direction in accordance with a vibration cycle or the like of a suppression target. In a case of providing the annular protrusion 7e, the shape of the entire outer ring 7a does not need to be changed. In other words, by changing only the shape of the annular protrusion 7e, it is possible to implement an effect of suppressing vibration of a target. As a result, designing can be facilitated. Furthermore, there is no need to enhance dimensional accuracy of the entire outer circumferential surface of the outer ring 7a. That is, if dimensional accuracy of the annular protrusion 7e is enhanced, vibration of the shaft 8 can be suppressed. As a result, manufacturing cost can be reduced.

A portion of the lubricating oil having contributed to suppressing vibration of the shaft 8 in the damper portion 25 and the lubricating oil having lubricated the ball bearing 7 is discharged from both ends of the bearing hole 2b. The remaining lubricating oil is discharged out of the bearing hole 2b via the through hole 24b and the oil drainage port 2e.

Meanwhile, the rolling elements 7c are also in contact with the outer ring 7a. Therefore, when the rolling elements 7c roll, the outer ring 7a slightly receives a load in the rotation direction due to friction at contact points with the rolling elements 7c. If the outer ring 7a can be fixed to the bearing housing 2, rotation of the outer ring 7a can be avoided. However, in this case, the damping effect of the damper portion 25 due to the lubricating oil cannot be obtained and vibration of the shaft 8 is not suppressed.

Therefore, on the thick side end surface 7f of the outer ring 7a, a protruding portion 26 protruding in the axial direction is provided. A recessed portion 27 into which the protruding portion 26 is inserted is provided on the end surface 24c of the outer diameter side spacer 24. When arranged in the bearing hole 2b, the protruding portion 26 and the recessed portion 27 are positioned below (on the oil drainage port 2e side) the shaft 8 in FIG. 2.

An inner wall 27a (regulating portion) positioned at both ends out of inner walls of recessed portion 27 in the rotation direction of the shaft 8 is opposed to the protruding portion 26 in the rotation direction of the shaft 8. Moreover, the inner wall 27a is slightly separated from the protruding portion 26 in the rotation direction. With the inner wall 27a and the protruding portion 26 being in contact, the protruding portion 26 (that is, the outer ring 7a) is restricted from rotating relative to the outer diameter side spacer 24. Since the outer diameter side spacer 24 is fixed to the bearing housing 2, rotation of the outer ring 7a (with respect to the bearing housing 2) is restricted. Here, a plurality of protruding portions 26 and recessed portions 27 corresponding thereto may be provided in the rotation direction while separated from each other. A region (size) extending in the rotation direction in which the protruding portion 26 is formed may be any size. For example, the region may be rectangular or a part of the rotation direction such as an arc shape. Alternatively, the region may have a semicircular shape extending over a half of a circumference in the rotation direction or other shapes.

In this manner, in the bearing structure S of the present embodiment, the damper portion 25 is formed on the outer ring 7a of the ball bearing 7. By regulating movement in the axial direction and the rotation direction without fixing the outer ring 7a, it is possible to pivotally support the shaft 8 while suppressing vibration of the shaft 8. Therefore, as compared to a case where a separate member having the damper portion 25 is provided, it is possible to reduce cost using for the separate member and assembling work.

In addition to regulating movement of the outer ring 7a in the rotation direction, the outer diameter side spacer 24 restricts movement of the outer ring 7a in the axial direction. Therefore, it is possible to reduce the number of parts as compared to the case of separately providing dedicated members and to further reduce the cost.

Moreover, in the case where the outer diameter side spacer 24 is a single member, for example, it is possible to accurately regulate movement of the outer ring 7a in the axial direction.

An oil groove 28 is provided on the end surface 24c of the outer diameter side spacer 24. The oil groove 28 is positioned above the shaft 8 in the vertical upper side (on the oil hole 2d side). Here, the position of the oil groove 28 in the rotation direction of the shaft 8 is different from that of the recessed portion 27. Providing the oil groove 28 enables efficiently supplying a part of the lubricating oil having contributed to suppressing vibration at the damper portion 25 to the rolling elements 7c.

In the embodiment described above, the case where the outer diameter side spacer 24 is provided has been described; however, a retaining ring may be provided instead of the outer diameter side spacer 24.

Figure 3:
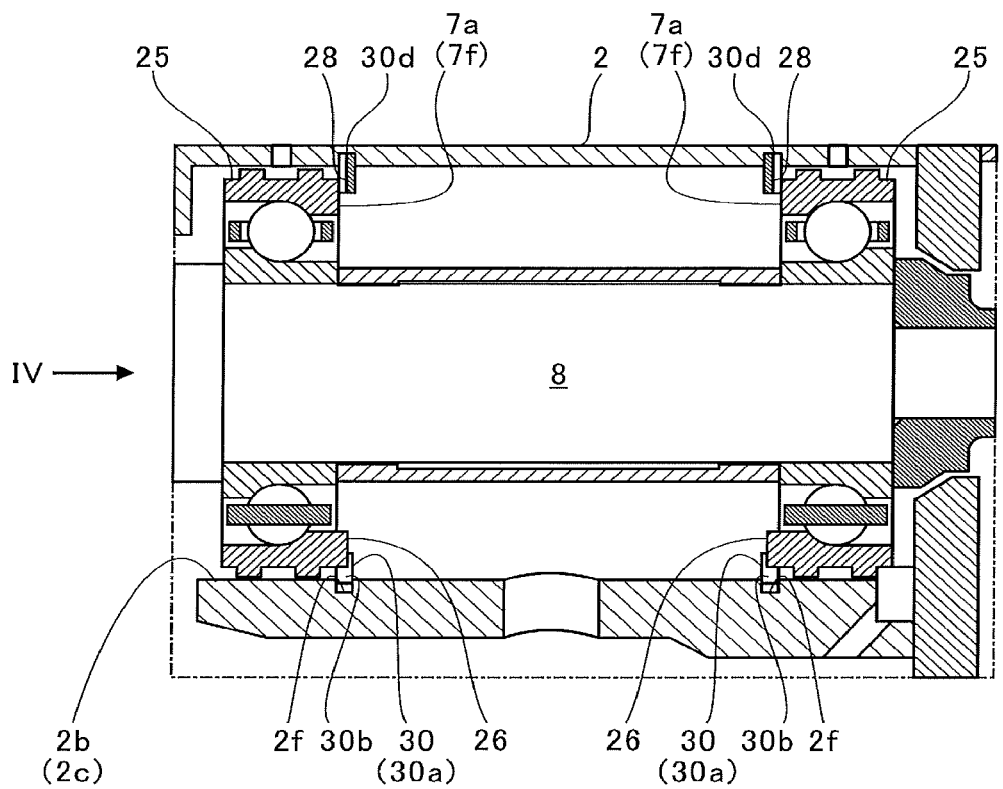
FIG. 3 is an extraction view of a position, corresponding to FIG. 2, of a first modification.

FIG. 3 is an extraction view of a position, corresponding to FIG. 2, of a first modification. As illustrated in FIG. 3, in the first modification, fixing grooves 2f are formed on the inner circumferential surface 2c of the bearing hole 2b. Two fixing grooves 2f are provided while separated from each other in the axial direction. Each of the fixing grooves 2f extends in the rotation direction of a shaft 8. A retaining ring 30 (opposed member) is fixed to each of the fixing grooves 2f.

Figure 4:
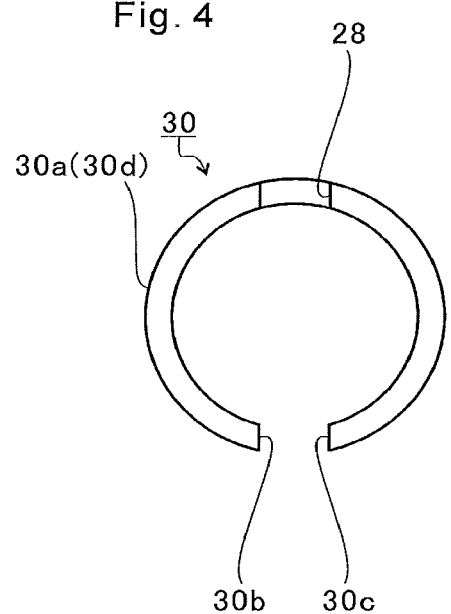
FIG. 4 is an explanatory diagram for explaining a retaining ring.

FIG. 4 is an explanatory diagram for explaining the retaining ring 30 and is a view of the retaining ring 30 from an arrow IV in FIG. 3. As illustrated in FIG. 4, the retaining ring 30 has a main body portion 30a of an arc shape. Both ends (one end 30b and another end 30c) opposed to each other across a gap in the circumferential direction of the main body portion 30a function similarly to the inner wall 27a of the outer diameter side spacer 24 described above.

Specifically, as illustrated in FIG. 3, an outer circumferential surface 30d of the main body portion 30a of the retaining ring 30 is press-fitted (fitted) into the fixing groove 2f, and the retaining ring 30 is fixed to a bearing housing 2. The fixing groove 2f is positioned on an outer side in the radial direction of a protruding portion 26 provided in an outer ring 7a. The retaining ring 30 is press-fitted into the fixing groove 2f in a direction in which the protruding portion 26 is positioned at the gap between the both ends in the circumferential direction. At this time, the end 30b and the other end 30c of the retaining ring 30 are opposed to the protruding portion 26 in the rotation direction of the shaft 8. The end 30b and the other end 30c are slightly separated from the protruding portion 26 in the rotation direction.

Thus, similarly to the outer diameter side spacer 24, the retaining ring 30 is opposed to a thick side end surface 7f of the outer ring 7a in the axial direction and regulates movement of the outer ring 7a in the axial direction. The retaining ring 30 further restricts movement of the protruding portion 26 in the rotation direction of the shaft 8.

Therefore, like in the aforementioned embodiment, it is possible to reduce cost using for the separate members and assembling work. It is possible to reduce the number of parts and to further reduce the cost as compared to the case of separately providing a member restricting movement of the outer ring 7a in the rotation direction and a member restricting movement of the outer ring 7a in the axial direction. Moreover, the retaining ring 30 has a small cubic volume and is inexpensive, and thus it is possible to reduce the weight in addition to reducing the cost.

Figure 5:
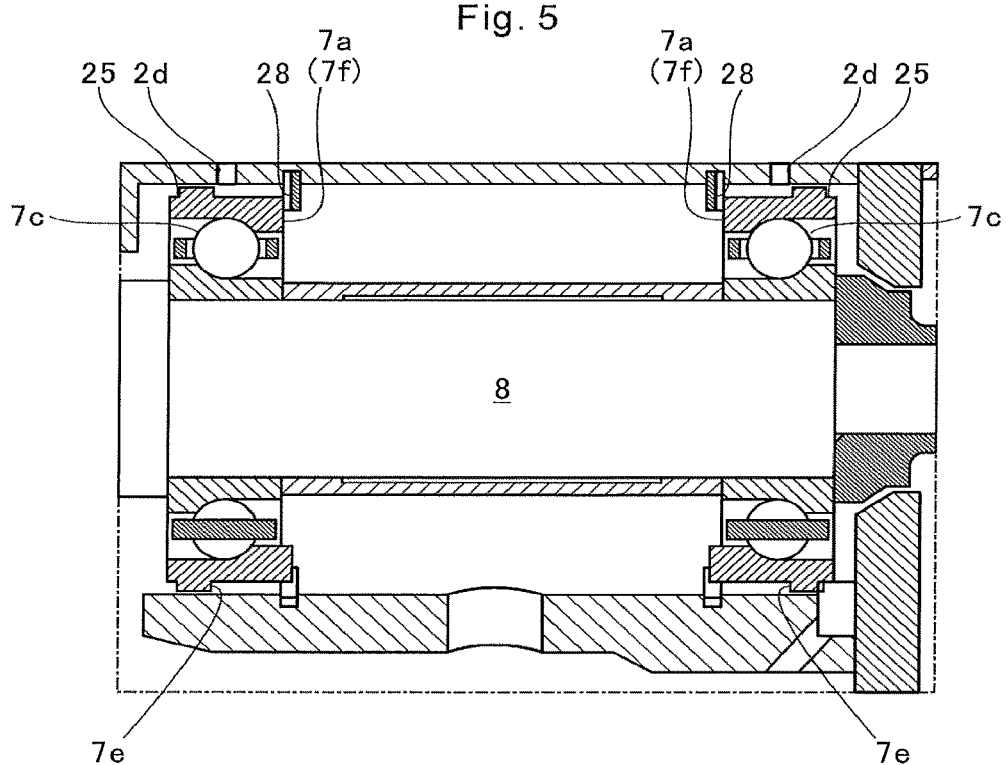
FIG. 5 is an extraction view of a position, corresponding to FIG. 2, of a second modification.

FIG. 5 is an extraction view of a position, corresponding to FIG. 2, of a second modification. In the aforementioned embodiment and the first modification, the case where the two annular protrusions 7e are provided in each of the outer rings 7a has been described. Meanwhile in the second modification, as illustrated in FIG. 5, one annular protrusion 7e is provided in each of the outer rings 7a. The two annular protrusions 7e are arranged on an outer side in the axial direction with respect to the two oil holes 2d (the opposite side to the approaching direction of the two ball bearings 7). In other words, in the ball bearing 7 on the turbine impeller 9 side, the annular protrusion 7e is positioned on the opposite side to the retaining ring 30 (the turbine impeller 9 side) with respect to the oil hole 2d. In the ball bearing 7 on the compressor impeller 10 side, the annular protrusion 7e is positioned on the opposite side to the retaining ring 30 (the compressor impeller 10 side) with respect to the oil hole 2d.

In this case, most of the lubricating oil flowing from the oil hole 2d into the bearing hole 2b flows through the oil groove 28 of the retaining ring 30 to the thick side end surface 7f side of the outer ring 7a. This facilitates supply to the rolling elements 7c. As a result, lubricating oil can be stably supplied to the ball bearing 7.

Figure 6:
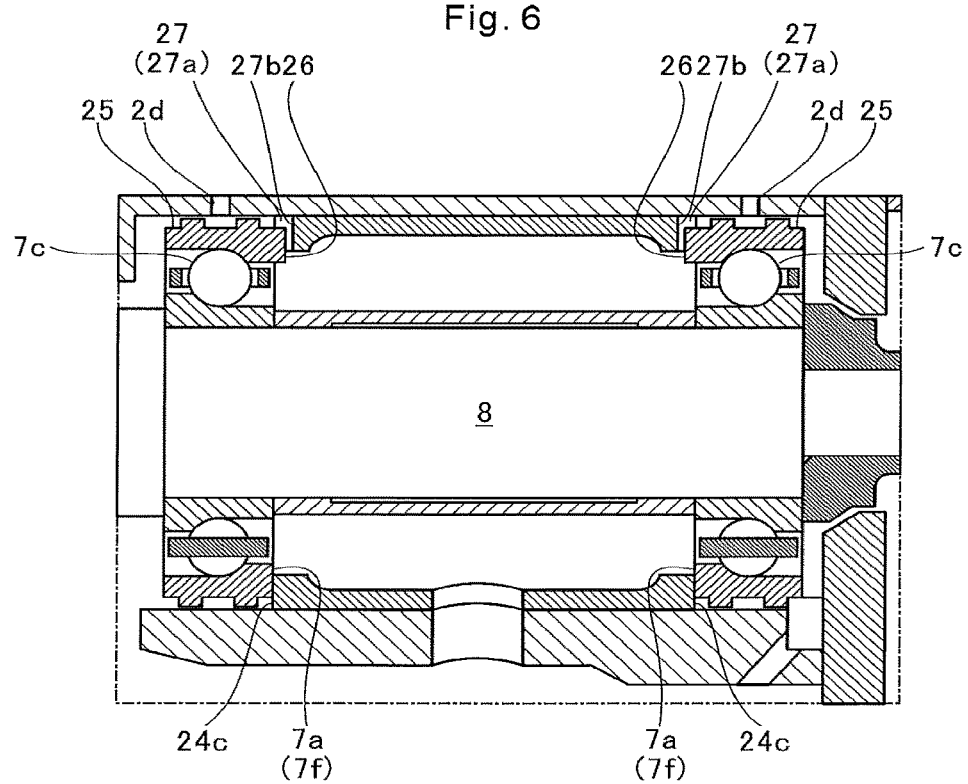
FIG. 6 is an extraction view of a position, corresponding to FIG. 2, of a third modification.

FIG. 6 is an extraction view of a position, corresponding to FIG. 2, of a third modification. In the aforementioned embodiment, the case where the oil groove 28 is provided on the end surface 24c of the outer diameter side spacer 24 has been described. However, without being limited thereto, instead of provided the oil groove 28 on the end surface 24c of the outer diameter side spacer 24, the oil groove 28 may be provided on the thick side end surface 7f of the outer ring 7a. In the third modification, a recessed portion 27 is arranged on an oil hole 2d side with respect to a shaft 8 without providing the oil groove 28.

Moreover, a protruding portion 26 has dimensions to allow separation from the bottom surface 27h of the recessed portion 27 when the thick side end surface 7f and the end surface 24c of the outer diameter side spacer 24 abut with each other. Therefore, a part of the lubricating oil having contributed to suppressing vibration at a damper portion 25 flows out to the rolling element 7c side through a gap between the bottom surface 27b of the recessed portion 27 and the protruding portion 26. That is, the recessed portion 27 has both functions of the regulating portion in the rotation direction of the shaft 8 and the oil groove 28 of the aforementioned embodiment, the first modification, and the second modification.

As described above, in the third modification, it is possible to efficiently supply lubricating oil to the rolling elements 7c without separately providing the oil groove 28. Therefore, lubricating oil can be stably supplied to the ball bearing 7.

In the aforementioned embodiment and the modifications, the case has been described where the protruding portion 26 is provided in the outer ring 7a, and the regulating portions (the inner wall 27a or the end 30b and the other end 30c) are provided in the opposed members (the outer diameter side spacer 24 or the retaining ring 30). However, without limited to this, the regulating portion may be provided on the outer ring, and the protruding portion may be provided in the opposed member.

Moreover, in the aforementioned embodiment and the modifications, the case where the damper portion 25 includes the annular protrusion 7e has been described; however, the annular protrusion 7e is not indispensable.

In the aforementioned embodiment and the modifications, the case has been described where the shaft 8 is inserted through the inner ring 7b of the turbine side bearing 20 and the inner ring 7b of the compressor side bearing 21. However, without limited to this, the shaft 8 may be press-fitted into each of the inner rings 7b.

Furthermore, in the aforementioned embodiment and the modifications, the case has been described where the ball bearing 7 is an angular bearing, and the protruding portion 26 is provided in the thick side end surface 7f. However, the ball bearing 7 is not limited to an angular bearing. In the case where the ball bearing 7 is an angular bearing, a regulating portion may be formed on the thick side end surface 7f. In this manner, the case where the ball bearing 7 is an angular bearing and the protruding portion or the regulating portion is provided in the thick side end surface 7f, is better than the case of providing the protruding portion or the regulating portion on the end surface 7g on the opposite side to the thick side end surface 7f in terms of the following points. That is, it is possible to secure a large contact area in the protruding portion and the regulating portion in the radial direction of the shaft 8, and thus it is possible to decrease a surface pressure to reduce influence of abrasion or the like.

In the aforementioned embodiment and the third modification, the case has been described where the two ball bearings 7 are provided in the bearing hole 2b while separated from each other in the axial direction. However, without limited to this, only one ball bearing 7 or three or more ball bearings 7 may be arranged.

Furthermore, in the aforementioned embodiment and the third modification, the case has been described where the outer diameter side spacer 24 is the opposed member. In the first modification and the second modification, the case has been described where the retaining ring 30 is the opposed member. However, without limited to this, and the opposed member may be another member axially opposed to the outer ring 7a.

In the aforementioned embodiment, the first modification, and the second modification, the oil groove 28 is provided; however, the oil groove 28 is not an indispensable structure.

Although the reasonable embodiment has been described with reference to the accompanying drawings, it is naturally understood that the respective configurations are not limited to the above embodiment. It is clear that those skilled in the art can conceive various modifications or variations within the scope described in the claims, and it is understood that they are naturally also within the technical scope.

What is claimed is:

1. A bearing structure, comprising:
  a ball bearing arranged in a bearing hole formed in a housing of a turbocharger, the ball bearing having an outer ring formed with a damper portion on an outer circumferential surface thereof;

an oil hole opened to the bearing hole, the oil hole opposed to the outer circumferential surface of the outer ring;

an opposed member fixed to the housing, the opposed member opposed to the outer ring in an axial direction of a shaft;

a protruding portion formed on one of the outer ring and the opposed member, the protruding portion protruding toward another one of the outer ring and the opposed member;

a regulating portion formed on the other one of the outer ring and the opposed member, the regulating portion opposed to the protruding portion in a rotation direction of the shaft; and an oil groove provided on an end surface of the outer ring opposed to the opposed member in the axial direction, or on an end surface of the opposed member opposed to the outer ring in the axial direction.

2. The bearing structure according to claim 1, wherein the damper portion includes a protrusion protruding in a radial direction of the shaft from the outer circumferential surface of the outer ring and extending in the rotation direction.

3. The bearing structure according to claim 2,
wherein the ball bearing is an angular bearing,
the opposed member is opposed to a thick side end surface which is an end surface thicker in the radial direction of the shaft out of both end surfaces of the outer ring in the axial direction, and
the protruding portion or the regulating portion is formed on the thick side end surface.

4. The bearing structure according to claim 3,
wherein two ball bearings are provided in the bearing hole while separated from each other in the axial direction, and
the opposed member is a spacer arranged between the two ball bearings to regulate movement of the two ball bearings in a direction approaching one another.

5. The bearing structure according to claim 4,
wherein a fixing groove extending in the rotation direction is formed in the bearing hole,
the opposed member has a main body portion of an arc shape, an outer circumferential surface of the main body portion is fitted in the fixing groove, and a first regulating portion is formed at a first end of the main body portion in a circumferential direction thereof and a second regulating portion is formed at a second end of the main body portion in the circumferential direction thereof.

6. The bearing structure according to claim 3,
wherein a fixing groove extending in the rotation direction is formed in the bearing hole,
the opposed member has a main body portion of an arc shape, an outer circumferential surface of the main body portion is fitted in the fixing groove, and a first regulating portion is formed at a first end of the main body portion in a circumferential direction thereof and a second regulating portion is formed at a second end of the main body portion in the circumferential direction thereof.

7. The bearing structure according to claim 2,
wherein two ball bearings are provided in the bearing hole while separated from each other in the axial direction, and
the opposed member is a spacer arranged between the two ball bearings to regulate movement of the two ball bearing in a direction approaching one another.

8. The bearing structure according to claim 7,
wherein a fixing groove extending in the rotation direction is formed in the bearing hole,
the opposed member has a main body portion of an arc shape, an outer circumferential surface of the main body portion is fitted in the fixing groove, and a first regulating portion is formed at a first end of the main body portion in a circumferential direction thereof and a second regulating portion is formed at a second end of the main body portion in the circumferential direction thereof.

9. The bearing structure according to claim 2,
wherein a fixing groove extending in the rotation direction is formed in the bearing hole,
the opposed member has a main body portion of an arc shape, an outer circumferential surface of the main body portion is fitted in the fixing groove, and a first regulating portion is formed at a first end of the main body portion in a circumferential direction thereof and a second regulating portion is formed at a second end of the main body portion in the circumferential direction thereof.

10. The bearing structure according to claim 2, wherein the protrusion is offset from the oil hole in the axial direction.

11. The bearing structure according to claim 1,
wherein the ball bearing is an angular bearing,
the opposed member is opposed to a thick side end surface which is an end surface thicker in the radial direction of the shaft out of both end surfaces of the outer ring in the axial direction, and
the protruding portion or the regulating portion is formed on the thick side end surface.

12. The bearing structure according to claim 11,
wherein two ball bearings are provided in the bearing hole while separated from each other in the axial direction, and
the opposed member is a spacer arranged between the two ball bearings to regulate movement of the two ball bearings in a direction approaching one another.

13. The bearing structure according to claim 12,
wherein a fixing groove extending in the rotation direction is formed in the bearing hole,
the opposed member has a main body portion of an arc shape, an outer circumferential surface of the main body portion is fitted in the fixing groove, and a first regulating portion is formed at a first end of the main body portion in a circumferential direction thereof and a second regulating portion is formed at a second end of the main body portion in the circumferential direction thereof.

14. The bearing structure according to claim 11,
wherein a fixing groove extending in the rotation direction is formed in the bearing hole,
the opposed member has a main body portion of an arc shape, an outer circumferential surface of the main body portion is fitted in the fixing groove, and a first regulating portion is formed at a first end of the main body portion in a circumferential direction thereof and a second regulating portion is formed at a second end of the main body portion in the circumferential direction thereof.

15. The bearing structure according to claim 1,
wherein two ball bearings are provided in the bearing hole while separated from each other in the axial direction, and
the opposed member is a spacer arranged between the two ball bearings to regulate movement of the two ball bearings in a direction approaching one another.

16. The bearing structure according to claim 15,
wherein a fixing groove extending in the rotation direction is formed in the bearing hole,
the opposed member has a main body portion of an arc shape, an outer circumferential surface of the main body portion is fitted in the fixing groove, and a first regulating portion is formed at a first end of the main body portion in a circumferential direction thereof and a second regulating portion is formed at a second end of the main body portion in the circumferential direction thereof.

17. The bearing structure according to claim 1,
wherein a fixing groove extending in the rotation direction is formed in the bearing hole,
the opposed member has a main body portion of an arc shape, an outer circumferential surface of the main body portion is fitted in the fixing groove, and a first regulating portion is formed at a first end of the main body portion in a circumferential direction thereof and a second regulating portion is formed at a second end of the main body portion in the circumferential direction thereof.

18. A turbocharger comprising the bearing structure according to claim 1.

* * * * *